United States Patent [19]

Bryant

[11]  4,189,234
[45]  Feb. 19, 1980

[54] NONCONTACTING METHOD FOR MEASURING ANGULAR DEFLECTION

[75] Inventor: Emmett L. Bryant, Newport News, Va.

[73] Assignee: The United States of America as represented by the Administrator of the National Aeronautics and Space Administration, Washington, D.C.

[21] Appl. No.: 953,390

[22] Filed: Oct. 23, 1978

[51] Int. Cl.² .............................................. G01B 11/26
[52] U.S. Cl. ..................................... 356/152; 350/25; 350/285; 356/150
[58] Field of Search ............... 356/141, 152, 254, 150; 350/23, 26, 16, 285, 25

[56] References Cited

U.S. PATENT DOCUMENTS

| | | | |
|---|---|---|---|
| 2,998,746 | 9/1961 | Gievers | 356/152 |
| 3,251,261 | 5/1966 | Lillestrand | 356/141 |
| 3,270,612 | 9/1966 | Collyer | 356/152 |
| 3,336,832 | 8/1967 | Snavely | 356/152 |
| 3,409,781 | 11/1968 | Immarco et al. | 356/141 |
| 3,470,377 | 9/1969 | Le Febre et al. | 356/152 |
| 3,601,613 | 8/1971 | Hock | 356/152 |
| 3,904,295 | 9/1975 | Hock et al. | 356/152 |
| 4,090,774 | 5/1978 | Zeifang | 350/285 |

Primary Examiner—S. C. Buczinski
Attorney, Agent, or Firm—William H. King; John R. Manning; Howard J. Osborn

[57] ABSTRACT

Apparatus for indicating the instantaneous angular deflection of an object about a selected axis without mechanical contact with the object. Light from a light source is transmitted through a first flat refractor to a converging lens which focuses the light through a second flat refractor onto a differential photocell. The first flat refractor is attached to the object such that when the object is deflected about the selected axis the refractor is also deflected about that axis. The two flat refractors are identical and they are placed an equal distance from the converging lens as are the light source and the photocell. The output of the photocell which is a function of image displacement is fed to a high gain amplifier that drives a galvanometer which rotates the second flat refractor. The second refractor is rotated so that the image displacement is very nearly zero making the galvanometer current a measure of the deflection of the object about the selected axis.

9 Claims, 1 Drawing Figure

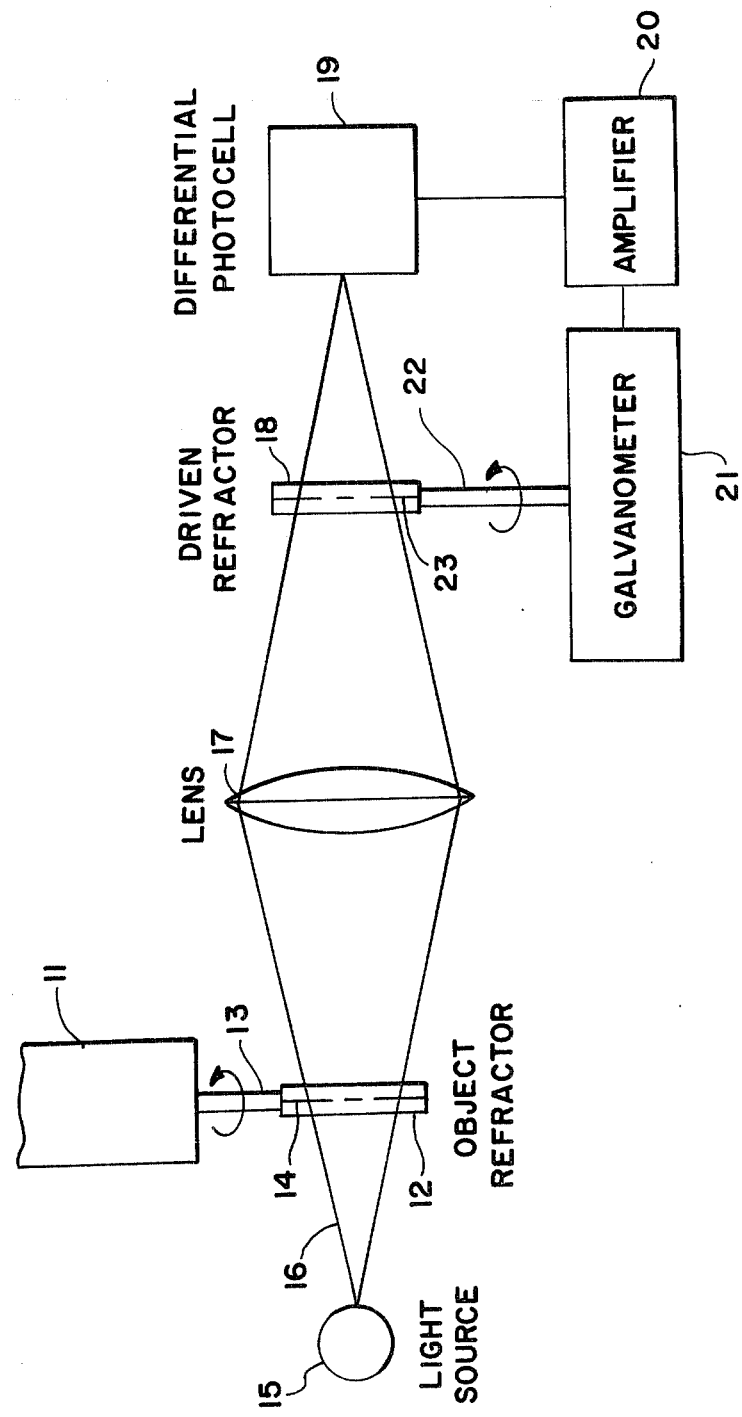

NONCONTACTING METHOD FOR MEASURING ANGULAR DEFLECTION

ORIGIN OF THE INVENTION

The invention described herein was made by an employee of the United States Government and may be manufactured and used by or for the Government for governmental purposes without the payment of royalties thereon or therefor.

BACKGROUND OF THE INVENTION

The invention relates generally to the measurement of the instantaneous angular deflection of an object and more specifically concerns electro-optical means for measuring the instantaneous angular deflection of an object without requiring mechanical contact with the object.

Previous electro-optical techniques for measuring the angular deflection of an object without mechanical contact with the object utilized modulation of a light beam by a variable density disc or a polarized disc and then measured the intensity of the light beam by means of a light sensor. These and other techniques suffer accuracy limitations due to light intensity changes, motional interaction, and nonlinear response.

It is therefore the primary object of the iinvention to provide means for measuring the angular deflections of an object without mechanical contact with the object that does not have the disadvantages of prior techniques.

A further object of this invention is to provide apparatus for measuring the angular deflection of an object without mechanical contact with the object that is simple and inexpensive.

Other objects and advantages of this invention will become apparent hereinafter in the specification and drawing.

SUMMARY OF THE INVENTION

A first flat refractor is attached to the object whose angular deflections about an axis through the object are to be measured. Light from a light source is passed through the first refractor onto a converging lens which converges the light through a second refractor onto a differential photocell. The output of the differential photocell is applied through a high gain amplifier to a galvanometer which is attached to the second refractor so that it deflects about an axis that is in the plane of the axis through the object. Consequently, any deflection of the object generates a current at the output of the photocell causing the galvanometer to deflect the second refractor to make the output of the photocell approach zero. This results in the galvanometer current being substantially proportional to the angular deflection of the object.

BRIEF DESCRIPTION OF THE DRAWING

The sole FIGURE in this application is a schematic drawing of the preferred embodiment of the invention.

DETAILED DESCRIPTION OF THE INVENTION

Turning now to the embodiment of the invention selected for illustration in the drawing the number 11 designates an object whose deflection about a selected axis is to be determined. A flat reflector 12 is attached to object 11 by any suitable means 13 so that when object 13 deflects about the selected axis 14 the refractor 12 will also deflect about the axis. The drawing shows the selected axis 14 to be through object refractor 14; however, it is not necessary that the selected axis be through the object refractor. A light source 15 produces light 16 which passes through refractor 12 to a converging lens 17. Converging lens 17 focuses the light through a refractor 18 identical to or similar to refractor 12 onto a differential photocell 19. Whenever the light is directed on the center of differential photocell 19 the photocell produces zero output and whenever the light is directed either to the right or left of center it produces either a positive or negative voltage. Photocells that will perform the function of differential photocell 19 are well known and commercially available. The voltage output of photocell 19 is applied through a high gain amplifier 20 to a galvanometer 21. Refractor 18 is mounted on the shaft 22 of galvanometer 21 to be driven by galvanometer 21 about an axis 23 passing through refractor 18 and in the plane of axis 14. Even though axis 23 is shown to coincide with the axis of rotation of galvanometer 21, it can be offset therefrom without departing from the invention. Galvanometer 21 includes a torque generator and a calibrated torsional spring. The output deflection of the spring is then a direct function of the galvanometer current which can be readily measured by existing methods.

In the operation of this invention refractors 12 and 18 are usually placed so that they are parallel to each other, perpendicular to the light from the light source and equal distance from the converging lens 16. Also, light source 15 and differential photocell 19 are usually placed equidistance from lens 17. Deviations from the above related placements of refractors 12 and 18, light source 15, differential photocell 19 and lens 17 can be made without departing from the invention. With no deflection of object 11, light from light source 15 passes through the two refractors undeviated and the light is focused at the center of photocell 19 resulting in no output from the photocell. Whenever refractor 12 is deflected in either direction the light is deviated by refractor 12 causing the light position on the differential photocell 19 to move either to the right or to the left of center. As a result photocell 19 produces an output voltage which is applied through amplifier 20 to galvanometer 21. This results in the galvanometer deflecting refractor 18 to a position where photocell 19 produces almost a zero current. Consequently, the galvanometer current which is read at the galvanometer is proportional to the deflection of the refractor 18 which in turn is approximately proportional to the deflection of object 11 about axis 14.

The advantages of this invention are numerous. It has the ability to indicate relatively large deflection angles without mechanical contact; its linearity and accuracy are virtually unlimited; it can measure rotational movement inside a closed but transparent chamber by placing the object refractor therein; its desired deflection measurements are not influenced by any other deflections of the refractor about other axes; it is relatively insensitive to extraneous light even without the use of a modulated light beam; and it is capable of fast response.

It is to be understood that the form of the invention herewith shown and described is to be taken as a preferred embodiment. Various changes may be made without departing from the invention. For example, a torque motor combined with a position sensor can be used in place of the galvanometer and the light beam could be modulated and then demodulation of the photocell output would eliminate any effect of background light.

What is claimed:

1. Apparatus for measuring the angular deflection of an object about a first axis through the object comprising:
   a first flat refractor with a uniform thickness attached to said object such that said first axis is perpendicular to the thickness dimension of said first refractor;
   a second flat refractor with a uniform thickness not attached to said object; and
   electro-optical means for deflecting said second flat refractor about a second axis in the plane of said first axis and perpendicular to the thickness dimension of said second refractor in response to and substantially equal to any deflection of said first flat refractor about said first axis whereby the deflection of said second refractor about said second axis is substantially equal to the angular deflection of said first refractor about said first axis.

2. Apparatus for measuring the angular deflection of an object according to claim 1 wherein said electro-optical means comprises:
   a light source located on the side of the said first refractor opposite said second refractor;
   a photocell means located on the side of said second refractor opposite said first refractor for producing a zero output when light is focused on its center, for producing a negative voltage when light is focused to one side side of center and for producing a positive voltage when light is focused to the other side of center;
   a lens located between said first and second refractors for focusing the light from said light source, that is passed through said first refractor, through said second refractor onto said photocell means; and
   means responsive to the output of said photocell means for deflecting said second refractor to maintain the focused light at substantially the center of said photocell means.

3. Apparatus for measuring the angular deflection of an object according to claim 2 wherein said means for deflecting said second refractor comprises an galvanometer connected to the output of the amplifier with the second refractor mounted for rotation on the shaft of the galvanometer.

4. Apparatus for measuring the angular deflection of an object according to claim 3 wherein said lens is located an equal distance from said first and second refractors.

5. Apparatus for measuring the angular deflection of an object according to claim 4 wherein said light source is the same distance from said first refractor as said photocell means is from said second refractor.

6. Apparatus for measuring the angular deflection of an object about a first axis through said object comprising:
   a first flat refractor attached to said object;
   a second flat refractor not attached to said object;
   a light source located on the side of said first refractor opposite said second refractor for directing light through said first and second refractors;
   a differential photocell means located on the side of said second refractor opposite said first refractor for producing a zero output when light is focused on its center, for producing a negative voltage when the focused light moves to one side of center and for producing a positive voltage when said focused light moves to the other side of center;
   a converging lens located between said first and second refractors for focusing through said second refractor onto said differential photocell the light passed through said first flat refractor; and
   means receiving the output of said differential photocell and attached to said second flat refractor for deflecting said second flat refractor about a second axis in the plane of said first axis to tend to reduce the output of said differential photocell to zero whereby the deflection of said second flat refractor about said second axis is substantially the same as any deflection of said first flat refractor about said first axis.

7. Apparatus for measuring the angular deflection of an object according to claim 6 wherein said first flat refractor and said second flat refractor are an equal distance from said converging lens.

8. Apparatus for measuring the angular deflection of an object according to claim 7 wherein said light source and said differential photocell are an equal distance from said converging lens.

9. Apparatus for measuring the angular deflection of an object according to claim 6 wherein said means attached to said second flat refractor for rotating said second flat refractor about a second axis includes a high gain amplifier receiving the output of said differential photocell and a galvanometer connected to the output of said high gain amplifier with its shaft connected to said second refractor to deflect it about said second axis.

* * * * *